United States Patent [19]
Hess et al.

[11] 4,413,072
[45] Nov. 1, 1983

[54] MIXTURES OF POLYURETHANES AND UNSATURATED POLYESTER RESINS

[75] Inventors: Bernhard Hess, Moers; Hansjochen Schulz-Walz, Krefeld; Hannes von Harpe, Krefeld; Bernd Peltzer, Krefeld; Ludwig Bottenbruch, Krefeld, all of Fed. Rep. of Germany

[73] Assignee: Bayer Aktiengesellschaft, Leverkusen, Fed. Rep. of Germany

[21] Appl. No.: 272,068

[22] Filed: Jun. 9, 1981

Related U.S. Application Data

[63] Continuation of Ser. No. 81,072, Oct. 2, 1979, abandoned.

[30] Foreign Application Priority Data

Oct. 7, 1978 [DE] Fed. Rep. of Germany ....... 2843822

[51] Int. Cl.$^3$ ...................... C08G 63/76; C08L 67/06
[52] U.S. Cl. .................................... 523/500; 523/512; 523/527; 525/19; 525/28; 525/440; 525/455; 525/920
[58] Field of Search .................. 525/19, 28, 440, 455; 523/500

[56] References Cited

U.S. PATENT DOCUMENTS

| 3,448,172 | 6/1969 | Damusis et al. | 525/28 |
| 3,578,728 | 5/1971 | Ehrhart | 525/28 |
| 3,886,229 | 5/1975 | Hutchinson | 525/28 |
| 3,933,728 | 1/1976 | Henbest | 525/28 |
| 4,035,439 | 7/1977 | Stevenson | 525/28 |

FOREIGN PATENT DOCUMENTS

| 2341121 | 3/1974 | Fed. Rep. of Germany . | |
| 994297 | 6/1965 | United Kingdom | 525/28 |
| 1239701 | 7/1971 | United Kingdom . | |
| 1279673 | 6/1972 | United Kingdom . | |
| 1382986 | 2/1975 | United Kingdom . | |
| 1393782 | 5/1975 | United Kingdom . | |
| 1406610 | 9/1975 | United Kingdom . | |
| 1412754 | 11/1975 | United Kingdom . | |

OTHER PUBLICATIONS

Chemical Abstract-Vol. 85, 1976, p. 55.

Primary Examiner—Paul Lieberman
Attorney, Agent, or Firm—Connolly and Hutz

[57] ABSTRACT

Unsaturated polyester resins containing—as additive—polyesterurethanes having free carboxyl groups and/or terminal radically polymerizable double bonds are good starting materials for manufacturing moulded articles with outstanding properties, particularly with an excellent impact strength.

1 Claim, No Drawings

MIXTURES OF POLYURETHANES AND UNSATURATED POLYESTER RESINS

This application is a continuation of application Ser. No. 81,072 filed Oct. 2, 1979 now abandoned.

This invention relates to mixtures of $\alpha,\beta$-ethylenically unsaturated polyesters, vinyl or vinylidene compounds copolymerisable therewith and polyurethanes containing carboxyl groups and/or at least one terminal polymerisable double bond per molecule, from which hardened mouldings with improved mechanical properties can be produced.

Japanese Patent Specification No. 19,696/72 describes mixtures containing an $\alpha,\beta$-ethylenically unsaturated polyester, vinyl monomers and a polyurethane which does not contain any free isocyanate groups. These mixtures are used for the production of moulding compositions which can be hardened to form low-shrinkage and low-distortion mouldings having a smooth surface. According to the description, the mechanical strengths of mouldings such as these (i.e. their flexural strength and stiffness in flexure) are no better and, if anything, slightly worse than those of mouldings which do not contain any polyurethane. According to the Japanese specification in question, the moulding compositions are produced by wet pressing.

One extremely rational and widely used method of processing unsaturated polyester resins is the resin mat process. In this process, the polyester resins are mixed with fillers, polymerisation initiators, auxiliaries and chemical thickeners, such as magnesium oxide for example, and glass fibre mats are impregnated with the resulting mixture and covered on both sides with masking film. After a ripening period of 1 to 3 days, the reaction of the chemical thickener with the unsaturated polyester resin causes the mass to harden to such an extent that the masking films can be removed without damaging the mat. The tack-free resin mass can be conveniently cut to size in this form and hardened in a heated press to form mouldings.

One significant disadvantage of mouldings produced from standard commercial unsaturated polyester resins, either by the resin mat process or by any other process, is their extreme brittleness which seriously restricts their use in various fields such as, for example, the motor vehicle industry.

It is known from the literature that, by incorporating shrinkage-reducing elastomeric additives in unsaturated polyester moulding compositions, it is possible at the same time to obtain a gradual improvement in the impact strength of mouldings produced therefrom (cf. for example German Auslegeschrifts Nos. 1,166,467 and 1,241,983 and U.S. Pat. Nos. 3,668,178; 3,882,078; 3,857,812 and 3,674,893). In this case, however, the inadequate compatibility of the elastomeric component with the solution of the unsaturated polyester resin in vinyl monomers causes difficulties either in the handling of the polyester resin or of the polyester resin composition produced therefrom by the incorporation of additives or in regard to thickening with chemical thickeners, in which case the resin mats obtained have a tacky surface so that, in many cases, the masking films cannot be removed without damaging the resin mat, or in regard to the hardened moulding which, although having reduced shrinkage, is also unevenly pigmented and patchy with only a slight improvement, if any, in impact strength. When mouldings of this type come into contact with solvents, for example during lacquering, the elastomeric additives can be swollen and dissolved out so that the otherwise usual favourable resistance to chemicals of the hardened unsaturated polyester resin compositions is lost.

Accordingly, there is a need for unsaturated polyester resins which, in solution in vinyl or vinylidene monomers, have as far as possible only a single phase, which can be thickened as required with chemical thickeners without separating and which, after hardening, give high-impact mouldings.

It has surprisingly been found that unsaturated polyester resins containing additions of polyurethanes with carboxyl groups and/or at least one terminal radically polymerisable double bond per molecule satisfy the above-mentioned requirements and give mouldings having outstanding properties.

Accordingly, the present invention provides mixtures of (A) 20 to 70 parts by weight of at least one $\alpha,\beta$-ethylenically unsaturated polyester containing at least three double bonds per molecule, (B) 20 to 70 parts by weight of at least one vinyl or vinylidene compound copolymerisable with (A), and (C) 3 to 30 parts by weight of at least one polyurethane, characterised in that the polyurethane (C)
  (i) is either free from carboxyl groups and contains at least one terminal radically polymerisable double bond per molecule, or
  (ii) does not have a copolymerisable double bond, but contains carboxyl groups corresponding to an acid number of at least 8 (based on polyurethane C), or
  (iii) contains at least on terminal radically polymerisable double bond per molecule and carboxyl groups corresponding to an acid number of at least 8 (based on polyurethane C).

The present invention also relates to the use of these mixtures for the production of thickened resin systems.

In order to clarify the invention, some of the expressions used in the specification are explained in the following:

"unsaturated polyesters A" are compounds free from urethane groups;

"double bonds per molecule" means the quotient of the number of analytically detectable double bonds and the average molecular weight (for the method of determination, see below);

"polyurethanes C" are polyurethanes containing both ester bonds and also urethane bonds, these polyurethanes containing at least 0.01 equivalents of urethane groups per 100 g of the polyurethane.

"terminally unsaturated" or "terminal radically polymerisable double bond" means that the first carboxylic acid or dicarboxylic acid residue, counting from the ends of the polymer chain, contains a polymerisable ethylenically unsaturated double bond, whilst the rest of the molecule does not contain any further ethylenically unsaturated (polymerisable) double bond.

The unsaturated polyesters (A) used in accordance with the invention may be obtained in conventional manner by polycondensing at least one $\alpha,\beta$-ethylenically unsaturated dicarboxylic acid containing from 4 to 6 carbon atoms (or ester-forming derivatives thereof), optionally in admixture with one or more $C_4$–$C_{20}$-dicarboxylic acids which do not contain any unsaturated aliphatic groups (or ester-forming derivatives thereof), with at least one dihydric alcohol containing from 2 to 30 carbon atoms. Preferred unsaturated dicarboxylic acids which do not contain any unsaturated aliphatic groups, or derivatives thereof, are phthalic acid or phthalic acid anhydride, isophthalic acid, terephthalic acid, hexahydro- or tetra-hydro-phthalic acid or their anhydrides, endomethylene tetrahydrophthalic acid or its anhydride, succinic acid or succinic acid anhydride and succinic acid esters and chlorides, glutaric acid, adipic acid, sebacic acid and trimellitic acid. In order to produce flame-resistant resins, it is possible to use, for example, hexachloroendomethylene tetrahydrophthalic acid, tetrachlorophthalic acid or tetrabromophthalic acid. Flame resistance may also be obtained by adding halogen-containing compounds which are not co-condensed with the polyester, such as chloroparaffins for example. Preferred polyesters contain maleic acid residues, of which up to 50 mole % may be replaced by phthalic acid or isophthalic acid residues. Preferred dihydric alcohols are ethylene glycol, 1,2-propane diol, 1,3-propane diol, diethylene glycol, dipropylene glyocl, 1,3-butane diol, 1,4-butane diol, neopentyl glycol, 2-ethyl-1,3-propane diol, 1,6-hexane diol, perhydrobisphenol, alkoxylated bis-phenols etc. The polyesters may have acid numbers of from 1 to 100, OH-numbers of from 10 to about 150 and theoretical molecular weights in the range of from about 500 to 10,000 and preferably in the range of from about 700 to 3000 (based on the acid and OH-numbers).

In the context of the invention, preferred copolymerisable vinyl and vinylidene compounds B are unsaturated compounds of the type commonly encountered in polyester technology which preferably contain α-substituted vinyl groups or β-substituted allyl groups, particularly styrene, but also, for example, nucleus-chlorinated and nucleus-alkylated or alkenylated styrenes, the alkyl groups containing from 1 to 4 carbon atoms, such as for example vinyl toluene, divinyl benzene, α-methyl styrene, tert.-butyl styrene, chlorostyrenes; vinyl esters of carboxylic acids containing from 2 to 6 carbon atoms, preferably vinyl acetate; vinyl pyridine, vinyl naphthalene, vinyl cyclohexane, acrylic acid and methacrylic acid and/or their esters (preferably vinyl, allyl and methallyl esters) containing from 1 to 4 carbon atoms in the alcohol component, their amides and nitriles, maleic acid anhydride, semiester and diester containing from 1 to 4 carbon atoms in the alcohol component, semiamides and diamides or cyclic imides, such as N-methyl maleic imide or N-cyclohexyl maleic imide, allyl compounds such as allyl benzene and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

The polyurethanes C (i) containing carboxyl groups essential to the present invention may have average molecular weights, as determined by membrane osmosis, in the range of from 2000 to 1,000,000 and preferably in the range of from 10,000 to 500,000. They may be produced in conventional manner by reacting a polyhydroxy compound having a molecular weight above 600, optionally a compound containing two reactive hydrogen atoms and having a molecular weight below 600, and a polyisocyanate. In addition to polyester amides or polyacetates, preferred polyhydroxyl compounds having a molecular weight above 600 are, in particular, linear or predominantly linear polyesters of the type which can be obtained, for example by thermal condensation, from ethylene glycol, 1,2-propane diol, 1,3-propane diol, diethylene glycol, dipropylene glycol, 1,3-butane diol, 1,4-butane diol, neopentyl glycol, 2-ethyl-1,3-propane diol, 1,5-pentane diol, 1,6-hexane diol, 2,2-bis-(hydroxymethyl)propionic acid and succinic acid, adipic acid, pimelic acid, suberic acid, azelaic acid, sebacic acid or phthalic acid. In addition to polyesters such as these, it is also possible to use hydroxyl polycarbonates, particularly those of 1,6-hexane diol and diaryl carbonates, and also esterification products of straight-chain hydroxyl alkane monocarboxylic acids containing at least 5 carbon atoms or the corresponding lactone polymers or castor oil. The polyesters are produced under such conditions that at least most of their terminal groups consist of hydroxyl groups. Polyethers, such as propylene oxide or tetrahydrofuran polymers, or polythioethers, such as condensation products of thiodiglycol alone or with other diols, are also suitable. These products generally have an average molecular weight in the range of from about 600 to 5000 and preferably in the range of from 1000 to 2500.

In addition to water or simple glycols, such as for example ethylene glycol, 1,3-propane diol, 1,4-butane diol, 1,5-pentane diol or 1,6-hexane diol, suitable compounds containing at least 2 isocyanate-reactive hydrogen atoms and having a molecular weight below 600 (chain extenders) are glycols containing urea, urethane, carbonamide or ester groups and also glycols containing tertiary nitrogen atoms. It is also possible to use glycols having aromatic ring systems, for example, 1,5-naphthylene-3-dioxethyl ether or hydroquinone-β-dioxethyl ether. Diamines such as o-dichlorobenzidine, 2,5-dichloro-p-phenylene diamine or 3,3'-dichloro-4,4'-diaminodiphenyl methane, are also suitable as are, for example, hydrazine, amino alcohols, such as for example N-allyl ethanolamine, and amino or oxycarboxylic acids such as 2,2-bis-(hydroxymethyl)-propionic acid.

Preferred polyisocyanates are aliphatic, cycloaliphatic, araliphatic or aromatic diisocyanates containing from 4 to 30 carbon atoms such as, for example, 1,4-butane diisocyanate, 1,6-hexane diisocyanate, 1,4-cyclohexane diisocyanate, 1-methyl-2,4-diisocyanato cyclohexane, 1-methyl-2,6-diisocyanato cyclohexane, 1-isocyanato-3-isocyanatomethyl-3,5,5-trimethyl cyclohexane, 2,4- and 2,6-diisocyanatotoluene, 4,4'-diphenyl methane diisocyanate, 4,4'-diphenyl propane diisocyanate, p-phenylene diisocyanate, 1,5-naphthylene diisocyanate and mixtures of these diisocyanates. It is particularly preferred to use 4,4'-diphenyl methane diisocyanate, 2,4- and 2,6-diisocyanato toluene and mixtures thereof.

The polyurethanes (C) containing carboxyl groups essential to the invention may be produced in conventional manner by reacting the polyhydroxyl compounds having a molecular weight above 600 with a diisocyanate in less than the quantity based on the terminal groups, adding the compound containing two reactive hydrogen atoms and having a molecular weight below 600 and completing the reaction by adding more diisocyanate. It is also possible to react the polyhydroxyl compounds with an excess of diisocyanates over and above the quantity required for reaction with the terminal groups and to measure the quantity in which the compound having a molecular weight below 600 is used in such a way that there is an excess over and above the quantity based on the isocyanate groups still present. It is, of course, also possible to react the mixture of the polyhydroxyl compound having a molecular weight above 600 and the compound having a molecular weight below 600 with a deficit of diisocyanates.

The carboxyl groups may be incorporated into the polyurethane resins according to the invention during their production either by using polyols containing carboxyl groups, even those having molecular weights above 600, for the reaction with diisocyanates or by subsequently acidifying the polyurethane free from NCO groups, for example with a dicarboxylic acid anhydride. It has proved to be particularly advantageous to use diols containing tertiary carboxyl groups because they do not react with NCO groups so that the quantity of carboxyl groups which can be incorporated may be calculated whereas other carboxyl groups react to some extent during the reaction with isocyanate.

The polyurethane C containing carboxyl groups should have an acid number of at least 8 and at most 50.

The polyurethanes C (i) containing at least one terminal radically polymerisable double bond per molecule which are essential to the invention may be produced in the same way as described above, but with the difference that diisocyanates are used in excess over and above the polyhydroxyl compounds, resulting in the formation of NCO-terminated polyurethanes of which the terminal NCO groups are subsequently reacted with radically polymerisable compounds which still contain at least one isocyanate-reactive hydrogen.

Examples of these radically polymerisable compounds still containing at least one isocyanate-reactive hydrogen are, for example, hydroxyalkyl esters of acrylic or methacrylic or crotonic acid, such as for example hydroxyethyl acrylate or methacrylate, hydroxypropyl acrylate or methacrylate, hydroxyl-containing low molecular weight esters of maleic, fumaric, itaconic or citraconic acid, such as bis-ethylene or -propylene glycol fumarate or maleate, allyl alcohol or allyl ether alcohols, such as dimethylol propane monoallyl ether, trimethylol propane mono- or di-allyl ether, etc.

The polyurethane C (iii) which contain both carboxyl groups corresponding to an acid number of at least 8 and also at least one terminal radically polymerisable double bond per molecule may be produced by a combination of the two processes described above, i.e. by producing an NCO-terminated, carboxyl-containing polyurethane of which the terminal groups are reacted in the manner described with a radically polymerisable compound which still contains at least one diisocyanate-reactive hydrogen. It is particularly preferred to use polyurethanes produced in this way because, in the production of resin mats, they are co-thickened with chemical thickeners, such as magnesium oxide, and can no longer be dissolved out after hardening as a result of copolymerisation.

The polyurethanes C may be produced in the melt or in the form of a solution in B and may subsequently be mixed with the unsaturated polyester A or a solution thereof in B. These solutions are preferably clear or are only slightly clouded due to their structural viscosity. Where more serious incompatibility occurs, for example between two polyester and polyurethane solutions in styrene, separation may be eliminated by assimilating the esterification components of the unsaturated polyester A and the polyurethane C. If the unsaturated polyester A, for example, predominantly contains methyl-branched diols, the polyurethane resin should also predominantly contain methyl-branched diols.

In order to protect the mixtures according to the invention against undesirable premature polymerisation, from 0.001 to 0.5 part by weight, based on 100 parts by weight of the sum of components A to C, of polymerisation inhibitors or antioxidants are added to components A and C, at the latest during dissolution in B. Preferred auxiliaries of this type are, for example, phenols and phenol derivatives, preferably sterically hindered phenols containing alkyl constituents with 1 to 6 carbon atoms in both o-positions to the phenolic hydroxy group, amines, preferably secondary aryl amines and their derivatives, quinones, copper salts of organic acids, and addition compounds of copper (I) halides with phosphites. Examples of such auxiliaries are 4,4'-bis-(2,6-di-tert.-butyl phenol), 1,3,5-trimethyl-2,4,6-tris-(3,5-di-tert.-butyl-4-hydroxyl benzyl)-benzene, 4,4'-butylidene-bis-(6-tert.-butyl-m-cresol), 3,5-di-tert.-butyl-4-hydroxyl benzyl phosphonic acid diethyl ester, N,N'-bis-($\beta$-naphthyl)-p-phenylene diamine, N,N'-bis-(1-methyl heptyl)-p-phenylene diamine, phenyl-$\beta$-naphthyl amine, 4,4'-bis-($\alpha,\alpha$-dimethyl benzyl)-diphenyl amine, 1,3,5-tris-(3,5-di-tert.-butyl-4-hydroxy hydrocinnamoyl)-hexahydro-s-triazine, hydroquinone, p-benzoquinone, toluhydroquinone, p-tert.butyl pyrocatechol, chloranil, naphthoquinone, copper naphthenate, copper octoate, Cu(I)Cl/triphenyl phosphite, Cu(I)Cl/trimethyl phosphite, Cu(I)Cl/tris-chloroethyl phosphite, Cu(I)Cl/tripropyl phosphite, p-nitrosodimethyl aniline. Other preferred stabilisers are described in "Methoden der organischen Chemie" (Houben-Weyl), Fourth Edition, Vol. XIV/1, pages 433 to 452, Georg Thieme-Verlag, Stuttgart, 1961. One extremely suitable stabiliser is hydroquinone, for example in a concentration of from 0.01 to 0.05 part by weight, based on 100 parts by weight of the unsaturated polyester A.

For producing moulding compositions from the mixtures according to the invention, the usual polymerisation initiators may be added to the mixtures in the usual quantities, preferably in quantities of from 0.5 to 5 parts by weight, based on 100 parts by weight of the sum of components A, B and C. Suitable polymerisation initiators are, for example, diacyl peroxides, such as diacetyl peroxides, dibenzoyl peroxide, di-p-chlorobenzoyl peroxide, peroxy esters, such as tert.-butyl peroxy acetate, tert.-butyl peroxy benzoate, tert.-butyl peroctoate, dicyclohexyl peroxy dicarbonate or 2,5-dimethyl hexane-2,5-di-peroctoate, alkyl peroxides such as bis-(tert.-butyl peroxy butane), dicumyl peroxide, tert.-butyl cumyl peroxide, hydroperoxides, such as cumene hydroperoxide, tert.-butyl-hydroperoxide, cyclohexanone peroxide, methyl ethyl ketone hydroperoxide, perketals, ketone peroxides, such as acetylacetate peroxide or azoisobutyrodinitrile.

The moulding compositions may contain as chemical thickeners oxides and/or hydroxides of metals belonging to the Second Main Group of the Periodic System, preferably magnesium and calcium, in quantities of from 0.1 to 10 parts by weight and preferably in quantities of from 1.0 to 4.0 parts by weight, based on 100 parts by weight of the sum of components A, B and C. The above-mentioned chemical thickeners may also be partly replaced by zinc oxide.

In addition, the moulding compositions may contain from 5 to 100 parts by weight and preferably from 10 to 40 parts by weight, based on 100 parts by weight of the sum of components A, B and C, of fibrous reinforcing materials. Suitable fibrous reinforcing materials are inorganic fibres, such as metal, asbestos, carbon and, in particular, glass fibres, and organic fibres such as, for example, cotton, polyamide, polyester, polyacrylonitrile or polycarbonate fibres.

Suitable inorganic fillers, which are normally used in quantities from 50 to 500 parts by weight, based on 100 parts by weight of the sum of components A, B and C, are for example chalk, talcum, powdered quartz and shale, kaolin, calc-spar, dolomite, mica, heavy spar, kieselguhr and diatomaceous earths.

Standard additives which may also be used are, for example, organic and inorganic pigments, dyes, lubricants, and release agents, such as zinc stearate, thixotropic agents, UV absorbers, shrinkage-reducing additives, etc.

The most rational way of producing the moulding compositions in the form of resin mats is intensively to mix mixtures A, B and C according to the invention with the other components, except for the reinforcing fibres, in dissolvers or on roll stands and to impregnate reinforcing fibres introduced in sheet form, including mats or woven fabrics, with this mixture. The surfaces of the resin mats thus produced may be protected on both sides by masking films. The films prevent the vinyl or vinylidene compounds B from evaporating and enable the mats to be rolled up and stored in compact form. After a thickening time, i.e. storage, for 1 to 2 days at room temperature, the masking films may be removed and, after having been suitable cut to size, the resin mats may be converted into mouldings by pressing for about 0 to 5 minutes under a pressure of from about 2 to 16 mPa at a temperature of about 120° to 160° C., depending on the shape and size of the mouldings. If necessary, thickening may of course also be accelerated by storage at elevated temperature, for example 50° C.

Moulding compositions, also known as bulk moulding compounds, may be similarly produced. After a finely dispersed fibre-free mixture of the above mentioned type has been prepared by means of dissolvers or roll stands, it is mixed with fibres, generally glass fibres, in kneaders. In the interests of simplicity, all the components (including the fibres) are in many cases also mixed in kneaders. The moulding compositions are ready for moulding after storage for 1 to 2 days at room temperature.

The mixtures according to the invention and the moulding compositions and mouldings produced therefrom are distinguished by the following advantages:

(1) The mixtures according to the invention are preferably clear solutions and, hence, do not present any problems in regard to storage and processing.

(2) The mixtures according to the invention have low viscosities which affords advantages in regard to the wetting of reinforcing fibres and fillers and provides for considerable latitude in the choice of the filler component.

(3) Mixtures according to the invention with polyurethanes containing carboxyl groups can be chemically thickened with chemical thickeners without separation and give dry resin mats which can be processed without difficulty.

(4) Mouldings based on the polyurethanes containing carboxyl groups show improved flexural strength and an almost threefold increase in impact strength over the base resins, even—surprisingly—in thickened form. In contrast to all other polyester resins, thickening with chemical thickeners produces virtually no reduction in impact strength.

(5) Mouldings based on the polyurethanes containing at least one radically polymerisable double bond are distinguished by the same high resistance to solvents because the polyurethane is chemically incorporated.

(6) Moulding compositions based on the mixtures according to the invention are distinguished by high dimensional stability under heat which is hardly affected by the added polyurethane.

The invention is illustrated by the following Examples and Comparison Examples in which the percentages quoted represent % by weight.

EXAMPLES AND COMPARISON EXAMPLES

Production of component A dissolved in B:

Two unsaturated polyesters are produced by the melt condensation under nitrogen from the components listed below. Esterification is carried out at 210° C. until the characteristics indicated are obtained. The polyesters are then dissolved in styrene at about 120° C. The solutions are designated PE 1 and PE 2:

| Polyester | PE 1 g | PE 2 g |
|---|---|---|
| Fumaric acid | — | 1160 |
| Maleic acid anhydride | 686 | — |
| Isophthalic acid | 498 | — |
| 1,2-propylene glycol | 456 | — |
| Diethylene glycol | 477 | — |
| Bis-hydroxypropyl bisphenol A | — | 3540 |
| Hydroquinone | 0.42 | 0.87 |
| Characteristics of the solution in styrene: | | |
| Styrene content (%): | 39 | 50 |
| Viscosity at 20° C. (mPas): | 1100 | 700 |
| Acid number (mg KOH/g): | 18 | 10 |

Production of component C dissolved in B:

1. Production of a preliminary stage polyol (PEA)

Adipic acid and ethylene glycol in a molar ratio of 1:1.03 are condensed by melt condensation under nitrogen at 210° C. until an acid number of 2 and an OH number of 63 are obtained. Corresponding to the OH number, the polyester obtained (PEA) has a calculated molecular weight of 1775.

2. Production of polyurethane solutions:

The quantities of the preliminary stage polyol PEA indicated in Table I are melted at 120° C. without or together with dimethylol propionic acid and the indicated quantities of tolylene-2,4-diisocyanate are added dropwise to the melt with cooling under nitrogen in such a way that the temperature of the melt does not exceed 120° C. After the dropwise addition, the melt is stirred for 15 minutes at 120° C. and then dissolved, in the percentage quantity indicated, in styrene stabilised with 0.01% of benzoquinone. The solutions are cooled to 75° C., 0.03%, based on the polyurethane solutions, of tin dilaurate is stirred in, afer which the solutions are stirred for 3 hours at that temperature and the indicated quantities of hydroxypropyl methacrylate are added. After another 3 hours at 75° C., the NCO content has fallen to below 0.01% and the solutions are cooled to room temperature. In the case of the Examples which do not contain any hydroxypropyl methacrylate, the last 3 hours' reaction time is left out. The solutions according to the invention are designated PU 1 to 4 and the associated comparison solutions by an additional V. Their characteristics are also shown in Table I.

Production of the Examples and Comparison Examples according to the invention:

The mixtures of the quantities by weight indicated in Table II of the polyurethane solutions PU 1 to 4 with the polyester solutions PE 1 and 2 at room temperature represent the Examples and Comparison Examples. The polyurethane-free polyester solutions PE 1 and 2 are also used for comparison.

2% by weight of benzoyl peroxide in the form of a 50% solution in dibutyl phthalate and 1.5% by weight of MgO are stirred into each of the mixtures according to the invention, after which the compositions are processed to form 4 mm thick plates. The compositions have thickened after ripening for 3 days. They are hardened for 3 hours at 80° C. and then tempered for another 15 hours at 100° C. In each case, one other plate is produced without MgO. The plates obtained are used to produce standard small test bars for measuring impact strength ($a_n$) and dimensional stability under heat according to Martens. The corresponding values are set out in Table II and distinctly show the advantageous influence of the polyurethane solutions according to the invention on the properties of the hardened system.

TABLE I

| Polyurethane solution | PU 1 | PU 1 V | PU 2 | PU 2 V | PU 3 | PU 4 |
|---|---|---|---|---|---|---|
| PEA g (moles) | 1065(0.6) | 1775(1.0) | 1243(0.70) | 1509(0.85) | 750(0.65) | 1775(1.0) |
| DMPS g (moles) | 53.6(0.4) | — | 40.2(0.3) | 20(0.15) | 47(0.35) | — |
| TDJ g (moles) | 170.5(0.98) | 170.5(0.98) | 182.7(1.05) | 182.7(1.05) | 182.7(1.05) | 182.7(1.05) |
| HPMA g (moles) | — | — | 15(0.15) | 15(0.15) | 15(0.15) | 15(0.15) |
| Styrene (%) | 68 | 68 | 68 | 68 | 68 | 50 |
| Sn—DL | 0.03 | 0.03 | 0.03 | 0.03 | 0.03 | 0.03 |
| Characteristics: | | | | | | |
| Viscosity at 20° C. (mPas) | 1630 | 1530 | 1420 | 670 | 8000 | thixotropic |
| Acid number of the solution | 5.4 | — | 3.6 | 1.6 | 6 | — |
| Acid number of the polyurethane | 17 | — | 12 | 5 | 19 | — |

Abbreviations:
PEA: Polyethylene glycol adipate
DMPS: Dimethylol propionic acid = 2,2-bis-(hydroxymethyl)-propionic acid
TDJ: Tolylene-2,4-diisocyanate
HPMA: Hydroxypropyl methacrylate
Sn—DL: Tin dilaurate

TABLE II

| Example No. | 1 | 1 V | 2 | 2 V | 3 | 4 | 3 V | 4 V |
|---|---|---|---|---|---|---|---|---|
| PU solution | PU 1 | PU 1 V | PU 2 | PU 2 V | PU 3 | PU 4 | — | — |
| PE 1: 62.3 g + | 37.7 g | 37.7 g | 37.7 g | 37.7 g | 37.7 g | — | — | — |
| PE 2: 80.0 g + | — | — | — | — | — | 20 g | — | — |
| PE 1: | — | — | — | — | — | — | 100 g | — |
| PE 2: | — | — | — | — | — | — | — | 100 g |
| Viscosity at 20° C. (mPas) | 700 | 1020 | 710 | 450 | 780 | 1430 | 1010 | 750 g |
| Without MgO | | | | | | | | |
| $a_n$ (KJ/m$^2$) | 13 | 9 | 17 | 17 | 16 | 20 | 7 | 9 |
| Martens value (°C.) | 69 | 65 | 69 | 68 | 64 | 95 | 86 | 115 |
| With 1.5% of MgO | | | | | | | | |
| $a_n$ (KJ/m$^2$) | 13 | 5 | 13 | 6 | 15 | — | 5 | — |
| Martens value (°C.) | 74 | 65 | 68 | 65 | 62 | — | 86 | — |

$a_n$ = Impact strength

We claim:

1. A thickened resin mat comprising:

(I) 100 parts by weight of a resin mixture,
(II) 5–100 parts by weight of reinforcing fibers and
(III) 0.1–10 parts by weight of a chemical thickener selected from the group consisting of magnesium oxide, magnesium hydroxide, calcium oxide, and calcium hydroxide, characterized in that the resin mixture I is a mixture of (A) 20 to 70 parts by weight of at least one $\alpha,\beta$-ethylenically unsaturated polyester containing at least three double bonds per molecule,
(B) 20 to 70 parts by weight of at least one vinyl or vinylidene compound copolymerizable with A, and
(C) 3 to 30 parts by weight of at least one polyurethane containing both ester moieties and at least 0.01 equivalents of urethane moiety per 100 g of the polyurethane and said polyurethane contains at least one terminal radically polymerizable double bond per molecule and sufficient carboxyl moieties corresponding to an acid number of at least 8 based on the polyurethane.

* * * * *